United States Patent [19]

Fujino et al.

[11] Patent Number: 4,579,446

[45] Date of Patent: Apr. 1, 1986

[54] BOTH-SIDE RECORDING SYSTEM

[75] Inventors: Hitoshi Fujino, Tokyo; Takashi Kitamura, Yokohama; Junji Ichikawa, Kamakura; Junichi Kimizuka, Yokohama, all of Japan

[73] Assignee: Canon Kabushiki Kaisha, Tokyo, Japan

[21] Appl. No.: 509,867

[22] Filed: Jun. 30, 1983

[30] Foreign Application Priority Data

Jul. 12, 1982 [JP] Japan ................................ 57-120958

Jul. 20, 1982 [JP] Japan ................................ 57-126501

[51] Int. Cl.[4] ...................... G03G 15/00; G03B 27/32; B65H 29/58

[52] U.S. Cl. ........................................ 355/24; 355/26; 271/185; 271/186

[58] Field of Search ................ 355/14 SH, 23, 24, 26; 271/65, 184–186, 225, DIG. 9

[56] References Cited

U.S. PATENT DOCUMENTS 3,100,113 8/1963 Bennette et al. .................... 271/184

3,575,507 4/1971 Varson et al. ........................ 355/23

4,236,814 12/1980 Tonkin ................................. 355/26

4,385,756 5/1983 Beery .................................. 271/186

FOREIGN PATENT DOCUMENTS 1289491 2/1969 Fed. Rep. of Germany ...... 271/185

1394541 5/1964 France ................................ 271/186

59-22847 2/1984 Japan .................................. 271/186

*Primary Examiner*—L. T. Hix

*Assistant Examiner*—Della Rutledge

*Attorney, Agent, or Firm*—Fitzpatrick, Cella, Harper & Scinto

[57] ABSTRACT

This specification discloses a both-side recording apparatus in which a sheet conveyed by first recording means for recording an image on a first surface of the sheet is reversed by sheet reversing means and directed to second recording means for recording an image on a second surface of the sheet, whereby images are recorded on the first and second surfaces of the sheet.

8 Claims, 12 Drawing Figures

BOTH-SIDE RECORDING SYSTEM

BACKGROUND OF THE INVENTION

1. Field of the Invention

This invention relates to a both-side image recording apparatus for recording images on both sides of a recording medium.

2. Description of the Prior Art

The conventional electrophotographic recording apparatus such as a copier or a laser printer has been constructed so that when it is desired to record images on both sides of a sheet, the sheet is first conveyed from a paper supply station to an image transfer station where a front surface toner image formed by an electrophotographic process is transferred to one surface of the sheet, and subsequently this toner image is fixed in a fixing station, whereafter the sheet is reversed by a reversing mechanism in the recording apparatus and transported back to the paper supply station and then a back surface toner image is formed on the other surface of the sheet through the same process. Therefore, the sheet conveyance route in the apparatus has been complicated and sheet jam has been liable to occur during the conveyance of the sheet, particularly, from the fixing station through the reversing mechanism to the paper re-supply station.

Also, where it is desired to record images on both sides of a sheet in the order of the original pages, the toner image of the first page is first formed on the front surface of the sheet and then the sheet is reversed. Subsequently, the sheet is transported back to the paper supply station and then the toner image of the second page is formed on the back surface of the sheet. Accordingly, the next sheet cannot substantially be reversed until the preceding sheet is completely reversed by the reversing mechanism in the recording apparatus and passes therethrough, and this has led to the disadvantage that the time efficiency (throughput) for conveyance is reduced.

To prevent this throughput from being reduced, there is a method whereby several odd pages corresponding to the front surfaces are formed on the front surfaces, whereafter even pages corresponding to the back surfaces are successively formed on the back surfaces. This method, however, requires a reversing mechanism for containing therein several pages of sheets printed on one side thereof and re-supplying them in the order of the original pages. This has led not only to the disadvantage that the apparatus becomes bulky and expensive, but also to the disadvantage that the reliability of sheet conveyance is further reduced.

There is also a both-side recording apparatus of the type which uses two printers exclusively for one-side recording and in which the two printers are series-connected together by a switch back type sheet reversing device so that one of the printers executes printing on the front surface of a sheet and the sheet is then conveyed to the other printer through the reversing device, after which the other printer executes printing on the back surface of the sheet. In such a both-side recording apparatus, the right and left ends of the sheet relative to the direction of movement of the sheet are not changed before and after the sheet reversing device, while the leading and trailing end edges of the sheet are changed and therefore, when both-side printing is effected, the tops and bottoms of the images on the front and back surfaces of the sheet are reversed relative to each other. For this reason, when an image is recorded on a photosensitive medium by the use of a laser beam, it has been necessary to reverse the top and bottom of the image or to turn breadth to length. Also, in the switch back type sheet reversing device, the sheet is once stopped and then moved in the opposite direction, and this has led not only to a reduced throughput but also to occurrence of jams which may result from even slight waving or curling of the sheet and thus, to many problems in sheet conveyance.

SUMMARY OF THE INVENTION

It is an object of the present invention to provide a both-side recording apparatus which is excellent in time efficiency for sheet conveyance.

It is another object of the present invention to provide a both-side recording apparatus in which occurrence of jams can be well prevented.

It is still another object of the present invention to provide a both-side recording apparatus in which pagination of sheets during both-side recording can be accomplished with good conveyance efficiency.

The main construction of the present invention which can achieve the above objects is a both-side recording apparatus comprising first recording means for recording an image on a first surface of a sheet, second recording means for recording an image on a second surface of the sheet, and sheet reversing means disposed between the first recording means and the second recording means to reverse the sheet conveyed from the first recording means and convey the sheet to the second recording means.

The invention will become more fully apparent from the following detailed description thereof taken in conjunction with the accompanying drawings.

DESCRIPTION OF THE PREFERRED EMBODIMENTS

Some embodiments of the present invention will hereinafter be described in detail by reference to the drawings.

Figure 1:
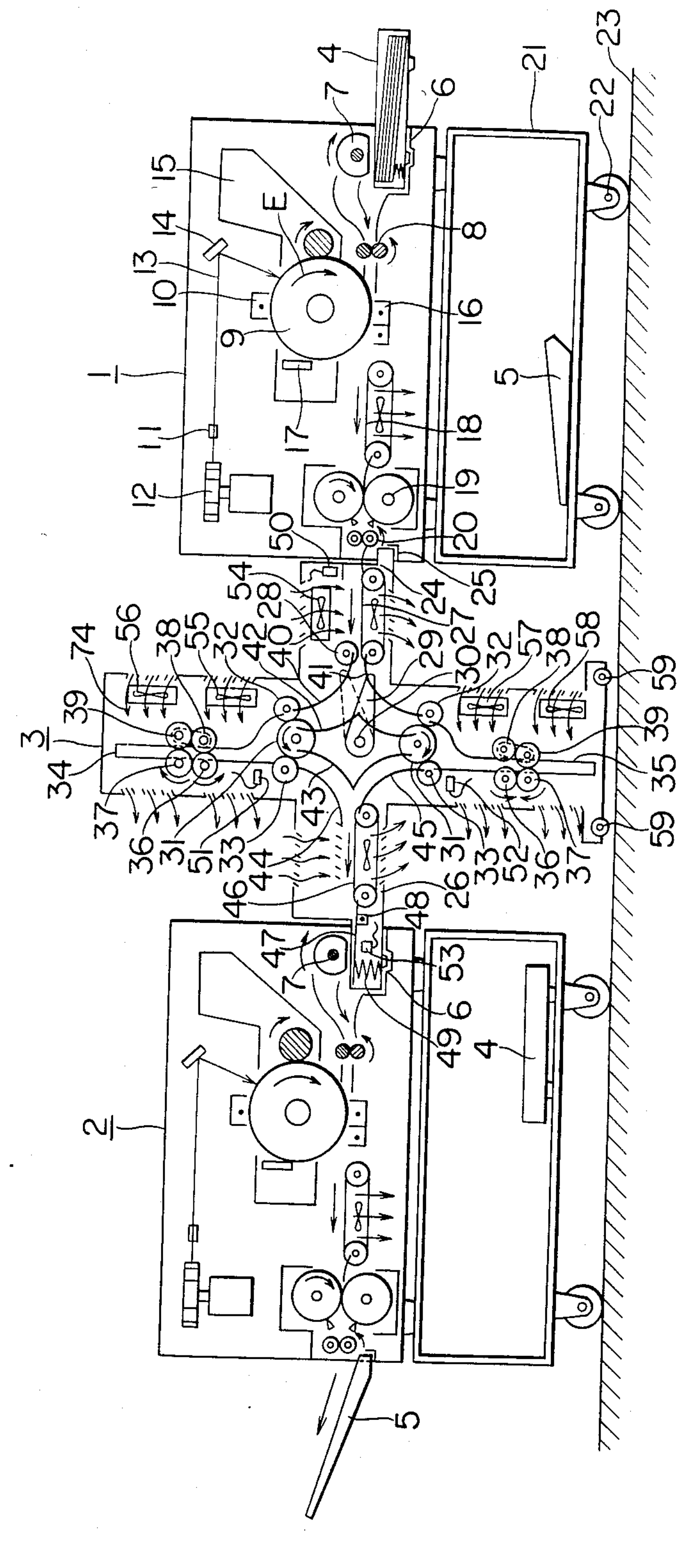
FIG. 1 is a longitudinal cross-sectional view of a both-side recording apparatus according to the present invention.

Referring to FIG. 1 which is a cross-sectional view of an embodiment of the both-side recording apparatus according to the present invention, reference numerals 1 and 2 designate recording units for recording images on the front and back surfaces, respectively, of a sheet.

Each of the recording units 1 and 2 is comprised of a laser beam printer (hereinafter referred to as the LBP). The LBP 1 and LBP 2 are similar in construction. Reference numeral 3 denotes a reversing unit for reversing the sheet, and reference numeral 4 designates paper supply cassettes one of which is mounted on the first laser printer and a second of which is provided not on the second laser printer but in a pedestal 21. Denoted by 5 are paper discharge trays one of which is contained in the pedestal 21 of the first LBP1 and another of which is mounted on the second LBP 2. Reference numeral 6 designates a cradle for receiving the paper supply cassette 4, reference numeral 7 denotes a pick-up roller for taking out sheets one by one from the paper supply cassette 4, and reference numeral 8 designates register rollers for feeding the taken out sheets into an image transfer station at predetermined timing. Reference numeral 9 denotes a photosensitive drum, reference numeral 10 designates a charger for uniformly charging the surface of the photosensitive drum, reference numeral 11 denotes a semiconductor laser, reference numeral 12 designates a scanner, reference numeral 13 denotes a laser beam, reference numeral 14 designates a turning-back mirror, reference numeral 15 denotes a developing device, reference numeral 16 designates an image transfer charger, and reference numeral 17 denotes a cleaner. The laser beam 13 of the semiconductor laser 11 turned on and off correspondingly to image information may be scanned by the scanner 12 lengthwise of the photosensitive drum 9, whereby an electrostatic latent image may be formed on the photosensitive drum 9 and a toner image may be obtained by the developing device 15. Reference numeral 18 designates a conveyor for sucking a sheet having a toner image transferred thereto by a suction mechanism and conveying the sheet by a belt, reference numeral 19 denotes a fixing device for heat-fixing the toner image on the sheet, and reference numeral 20 designates paper discharge rollers. Reference numeral 21 denotes a pedestal on which the LBP is placed. The pedestal 21 has casters 22 attached thereto and is movable on the floor 23.

The construction of the reversing device 3 will now be described. Designated by 24 is a first connecting portion for connecting the reversing device to the first LBP 1. The first connecting portion 24 is mounted on a cradle 25 from which the paper discharge tray 5 has been removed. Denoted by 26 is a second connecting portion for connecting the reversing device to the LBP 2. The second connecting portion 26 is mounted on the cradle 6 from which the paper supply cassette 4 has been removed. Reference numeral 27 designates a conveyor for conveying the sheets by a belt, and reference numeral 28 denotes a conveyor roller which bears against the conveyor belt of the conveyor 27 to feed the sheets. Designated by 29 is a sheet separating plate for upwardly distributing odd ones of the sheets successively conveyed by the conveyor 27 and downwardly distributing even ones of said sheets. Denoted by 30 is a separation shaft which serves as the pivot axis of the sheet separating plate. Reference numeral 31 denotes a reversing roller, reference numeral 32 designates an input roller and reference numeral 33 denotes an output roller. These rollers are in contact with one another and rotated in the directions suggested by the arrow. Two sets of such rollers are provided in the upper and lower stages. Reference numeral 34 designates an upper reversing guide and reference numeral 35 denotes a lower reversing guide, and sheets may be switched back therein. Reference numeral 36 designates an up roller rotated in a direction for upwardly lifting the sheets fed into the reversing guide 34 or 35, and reference numeral 37 denotes a down roller rotated in a direction for downwardly feeding the sheets. Pressure rollers 38 and 39 seesaw to feed the sheets by the pair of rollers bearing thereagainst. Designated by 40–45 are guide plates for guiding the sheets. Reference numeral 46 denotes a conveyor for conveying the sheets by a belt, and reference numeral 47 designates a paper re-supply plate supported by a rotary shaft 48 and upwardly biased by a paper supply spring 49. Designated by 50–53 are sheet sensors for detecting the leading end edge or the trailing end edge of a sheet. The sensor 50 is a sheet sensor for operating the separating plate 29 in a predetermined time after the leading end edge of a sheet has been detected. The sensor 51 is an upper sheet sensor for seesawing the pressure rollers 38 and 39 simultaneously with the detection of the trailing end edge of a sheet and reversing the direction of feeding of the sheet. The sensor 52 is a lower sheet sensor for seesawing the pressure rollers 38 and 39 simultaneously with the detection of the trailing end edge of a sheet and reversing the direction of feeding of the sheet. The sensor 53 is a sheet sensor for detecting the leading end edge of a sheet conveyed by the conveyor 46 while being sucked to the belt thereof and simultaneously therewith, driving the pick-up roller 7 of the second LBP 2 to effect paper re-supply. Designated by 54–58 are cooling fans. A sheet having one side (front surface) thereof printed by the first LBP 1 has residual heat resulting from the heat fixation and is cooled by these cooling fans 54–58 to prevent curling of the sheet or toner offset to the apparatus. Louvers for introducing cold air are provided at important points in the housing of the reversing device. The upper and lower reversing guides 34 and 35 are formed with ventilating holes (not shown), for example by the punching metal, for cooling the sheets. Designated by 59 are the casters of the reversing device. In the connected position of the reversing device, the casters 59 are refloated with respect to a floor 23.

Figure 2:
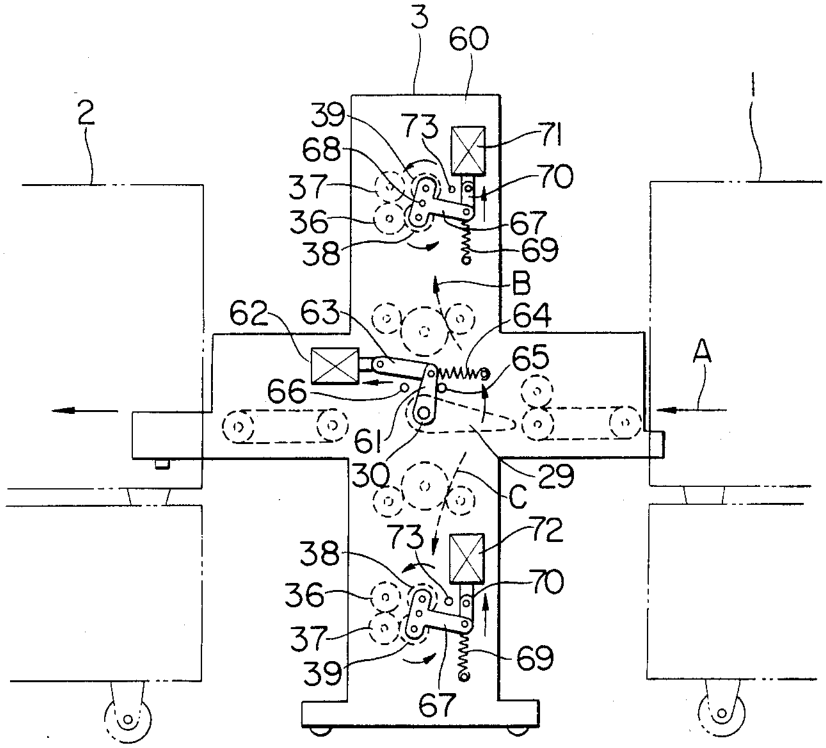
FIG. 2 is a front view of a reversing device.

FIG. 2 is a front view of the reversing device 3 shown in FIG. 1 and shows the rocking mechanism of the separating plate 29, the pressure mechanism and the pressure releasing mechanism of the pressure rollers 38 and 39. Designated by 60 is the front side plate of the reversing device 3 which is pivotably supported with the separation shaft 30 by means of a bearing, not shown. Denoted by 61 is a separating arm fixed to the separation shaft 30. Reference numeral 62 designates an electromagnetic solenoid, reference numeral 63 denotes a link, reference numeral 64 designates a tension spring, and reference numerals 65 and 66 denote stoppers. When the electromagnetic solenoid 62 is not energized, the separating plate 29 faces downwardly due to the action of the tension spring 64 and feeds the sheets conveyed from the direction of arrow A in the direction of arrow B, namely, into the upper reversing guide 34. On the other hand, when the electromagnetic solenoid 62 is energized, the separating plate 29 faces upwardly as indicated by broken line in FIG. 1 and feeds the sheets in the direction of arrow C, namely, into the lower reversing guide 35. Designated by 67 are pressure arms on which the pressure rollers 38 and 39 are rotatably supported. Each of the pressure arms 67 is adapted to seesaw about a pivot shaft 68 and change over the direction of feeding of the sheets. Reference numeral 69 designates tension springs, reference numeral 70 denotes links, reference numerals 71 and 72 designate upper and lower electromagnetic solenoids, respectively, and reference numeral 73 denotes stoppers. Normally, in the upper reversing portion, the up roller 36 and the pressure roller 38 are in contact with each other and in the lower reversing portion, the down roller 37 and the pressure roller 39 are in contact with each other. When the electromagnetic solenoids 71 and 72 are energized, the pressure arms 67 effect seesaw movement.

Figure 3:
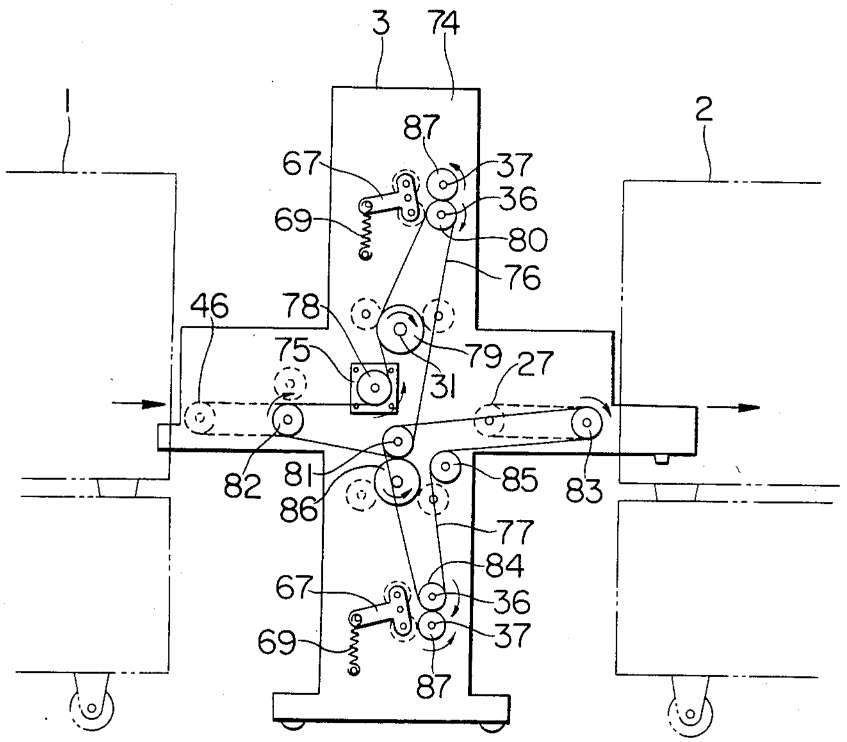
FIG. 3 is a rear view of the reversing device.

FIG. 3 is a rear view of the reversing device 3 and shows the conveyors 27 and 46 and a driving mechanism for rotatively driving the upper and lower reversing rollers 31 and the up and down rollers 36 and 37. Designated by 74 is the back side plate of the reversing device 3 which, with the front side plate 60, supports the above-mentioned rollers by bearings, not shown. Reference numeral 75 denotes a drive motor, reference numerals 76 and 77 designate timing belts, reference numeral 78 denotes a drive pulley, reference numerals 79–84 designate driven pulleys, and reference numeral 85 denotes a floating pulley. Designated by 86 and 87 are driven gears which are in mesh engagement with gears, not shown, at the back of the driven pulleys 80, 81 and 84. The driven pulleys 79–84 and the driven gears 86, 87 are directly connected to the rotary shafts of the conveyors 27, 46, the upper and lower reversing rollers 31 and the up and down rollers 36 and 37, respectively, so that they are rotated in a predetermined direction by the drive motor 75 through the timing belts 76, 77 and the driven gears 86, 87.

The printing operation during both-side recording in the above-described construction will hereinafter be described. A first sheet is fed from the paper supply cassette 4 of the first LBP 1 by the pick-up roller 7. The first sheet is fed to the image transfer station by the register rollers 8 at predetermined timing so as to be synchronized with the toner image of the first page formed on the photosensitive drum 9, and then the toner image on the photosensitive drum 9 is transferred onto the sheet by the image transfer charger 16. The sheet is transported to the heat-fixing device 19 by the conveyor 18 and the toner image of the first page is fixed on the front surface of the sheet. The sheet is then discharged from the LBP 1 into the reversing device 3 by the discharge rollers 20. Further sheets are fed from the paper supply cassette 4 at predetermined timing and the images of odd pages such as the third page, the fifth page, etc. are recorded on the front surfaces of the further sheets in the manner described above.

In the reversing device 3, the drive motor 75 is started as soon as paper feeding is started in the first LBP 1. The sheets discharged from the LBP 1 are successively sucked and conveyed by the conveyor 27 and transported to the conveyor rollers 28 while the image bearing surfaces of the sheets are being cooled by the cooling fan 54. At this time, the separating plate 29 is in a position as indicated by solid line in FIG. 1. Accordingly, the sheets are transported to the input roller 32 along the upper surface of the separating plate 29 and the guide plates 40 and 42 and are further transported upwardly along the reversing guide 34, and then are lifted by the up roller 36. The trailing end edge of the sheet passes the input roller 32 and the sheet is perfectly contained in the upper reversing guide 34.

At this time, in the reversing guide 34, the sheet has its residual heat completely removed by the cooling fans 55 and 56 and is lightly urged against the lest wall surface of the reversing guide by wind pressure. As soon as the sheet sensor 51 detects the trailing end edge of the sheet, the upper electromagnetic solenoid 71 is energized to cause the pressure arm 67 to seesaw. That is, the contact between the up roller 36 and the pressure roller 38 is released and conversely, the down roller 37 and the pressure roller 39 come into contact with each other and transport the trailing end edge of the sheet to the lower output roller 32. The sheet thus reversed arrives at the conveyor 46 along the guide plates 43 and 44 and is sucked by the conveyor 46 and conveyed by the belt onto the paper re-supply plate 47.

At this time, when the sheet sensor 53 detects the leading end edge of the sheet, the second LBP 2 starts its printing operation. In the second LBP 2, the pick-up roller 7 is rotated to feed the reversed first sheet and the image of the second page is printed on the back surface of the first sheet, whereafter the sheet is discharged onto the paper discharge tray 5.

The second sheet succeeding to the first sheet becomes contained in the lower reversing guide 35 by the separating plate 29 facing upwardly with the separating electromagnetic solenoid 62 being energized in a predetermined time after the sheet sensor 50 in the reversing device 3 detects the leading end edge of the second sheet. As soon as the sheet sensor 52 detects the trailing end edge of the second sheet, the electromagnetic solenoid 72 is energized and the up roller 36 and the pressure roller 38 come into contact with each other and cooperate with the wind pressure of the cooling fans 57 and 58 to transport the trailing end edge of the sheet to the output roller 33, thereby reversing the second sheet.

As described above, the present apparatus is designed such that after the printing has been started, odd-numbered sheets are reversed by the upper reversing mechanism and even-numbered sheets are reversed by the lower reversing mechanism.

An embodiment of the image recording process in the both-side recording apparatus according to the present invention will now be described by reference to FIGS. 4 and 5.

Figure 4:
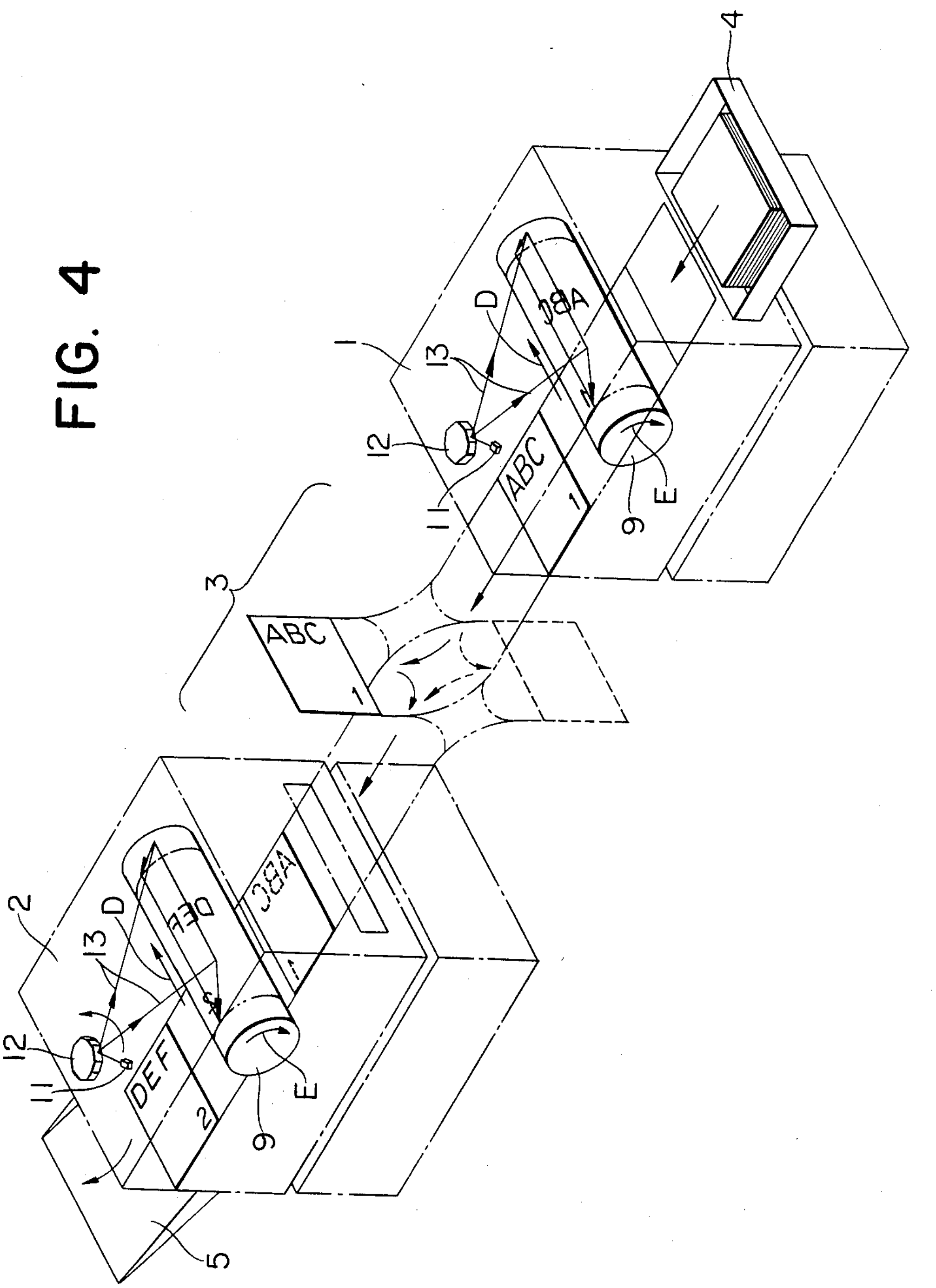
FIGS. 4 and 6 are schematic perspective views showing the both-side image recording process according to the present invention.

FIG. 4 shows an example in which both-side recording is carried out just by the same image forming method in the first LBP 1 and the second LBP 2. When an electrostatic latent image is to be formed with the laser beam 13 emitted from the laser 11 being scanned on the surface of the photosensitive drum 9 by the scanner 12, images are recorded on both sides of a sheet with the top-bottom direction of the images being coincident with the scanning direction D (identical to the lengthwise direction of the photosensitive drum 9), that is, with the top-bottom direction of the images being orthogonal to the direction of movement of the sheet. Accordingly, if, as shown in FIG. 4, character patterns ABC and DEF are printed on one side of each sheet, the top and bottom of the characters on both sides are not reversed even if the reversal by switch back is effected between the first LBP 1 and the second LBP 2, since the direction of movement of the sheets is coincident with the direction of arrangement of the characters FIG. 5 is a block diagram showing a control unit 30 for turning the length to breadth of image information as described above and effecting the recording on both sides of sheets by the LBP 1 and LBP 2. This control unit 30 is provided in the reversing device 3.

Designated by 90 and 91 are page memories, each of which is capable of storing image information corresponding to one page. Reference numeral 92 designates a control for turning length to breadth which turns the length to breadth of the image information stored in the page memory 90 or 91, reference numeral 93 denotes a memory for storing the front surface image information turned from length to breadth by the control 92 for turning length to breadth, and reference numeral 94 designates a memory for storing the back surface image information turned from length to breadth by the control 92 for turning length to breadth. Each of the memories 93 and 94 is capable of storing image information corresponding to one page. Reference numeral 95 denotes a switch for selecting the page memories 90 and 91 for storing image information, reference numeral 96 designates a switch for selecting the page memories 90 and 91 when image information is read out, reference numeral 97 denotes a switch for selecting the front surface image memory 93 or the back surface image memory 94 for storing the image information turned from length to breadth, and reference numeral 98 designates an address bus for selecting the addresses of the page memories 90 and 91.

Where image information sent from CPU, MT or the like is the image information to be recorded on the front surface of a sheet, the switch 95 is changed over to a broken-line position and the sent image information corresponding to one page is stored in the page memory 90. Subsequently, the switches 96 and 97 are changed over to solid-line positions and the image information is read out from the page memory 90. In this case, the address bus 98 is controlled by the control 92 for turning length to breadth so that data written in the page memory 90 in the column direction is read out in the row direction. By being thus read out, the image information turned from length to breadth is stored in the front surface image memory 93. On the basis of this image information, image recording is effected on the front surface of a sheet by the LBP 1.

Also, when the image information is read out from the page memory 90, the switch 95 is changed over to the solid-line position and the back surface image information is stored in the page memory 91. When the recording on the front surface is completed, the image information is read out from the page memory 91 as previously described and turned from length to breadth and stored in the back surface image memory 94. On the basis of this image information, image recording is effected on the back surface of the sheet.

Another embodiment of the image recording process in the both-side recording apparatus according to the present invention will now be described by reference to FIGS. 6 and 7.

Figure 6:
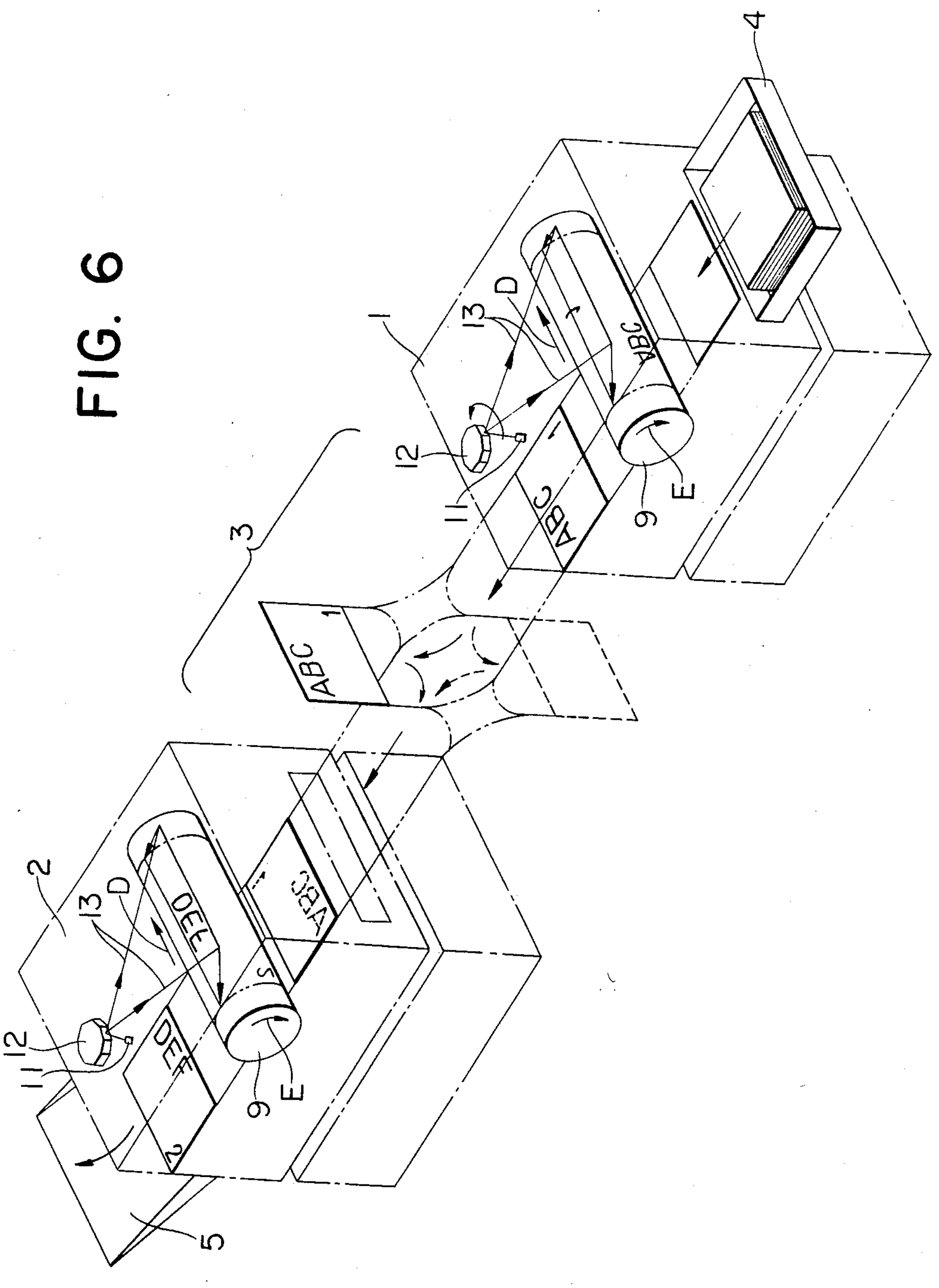

FIG. 6 shows an example in which both-side recording is effected by different image forming methods in the first LBP 1 and the second LBP 2. In the first LBP 1, an image is laser-recorded in the direction from top to bottom relative to the direction of rotation E of the photosensitive drum 9, while in the second LBP 2, an image is laser-recorded in the direction from bottom to top. That is, printing is effected so that, relative to the direction of movement of the sheet, the top and bottom are reversed with the switch back type reversal as the boundary.

Accordingly, if, as shown in FIG. 6, character patterns ABC and DEF are printed on one side of each sheet, the top and bottom of the characters on both sides are not reversed since the top and bottom of the characters relative to the direction of movement of the sheet are reversed before and after the switch back type reversal.

Figure 7:
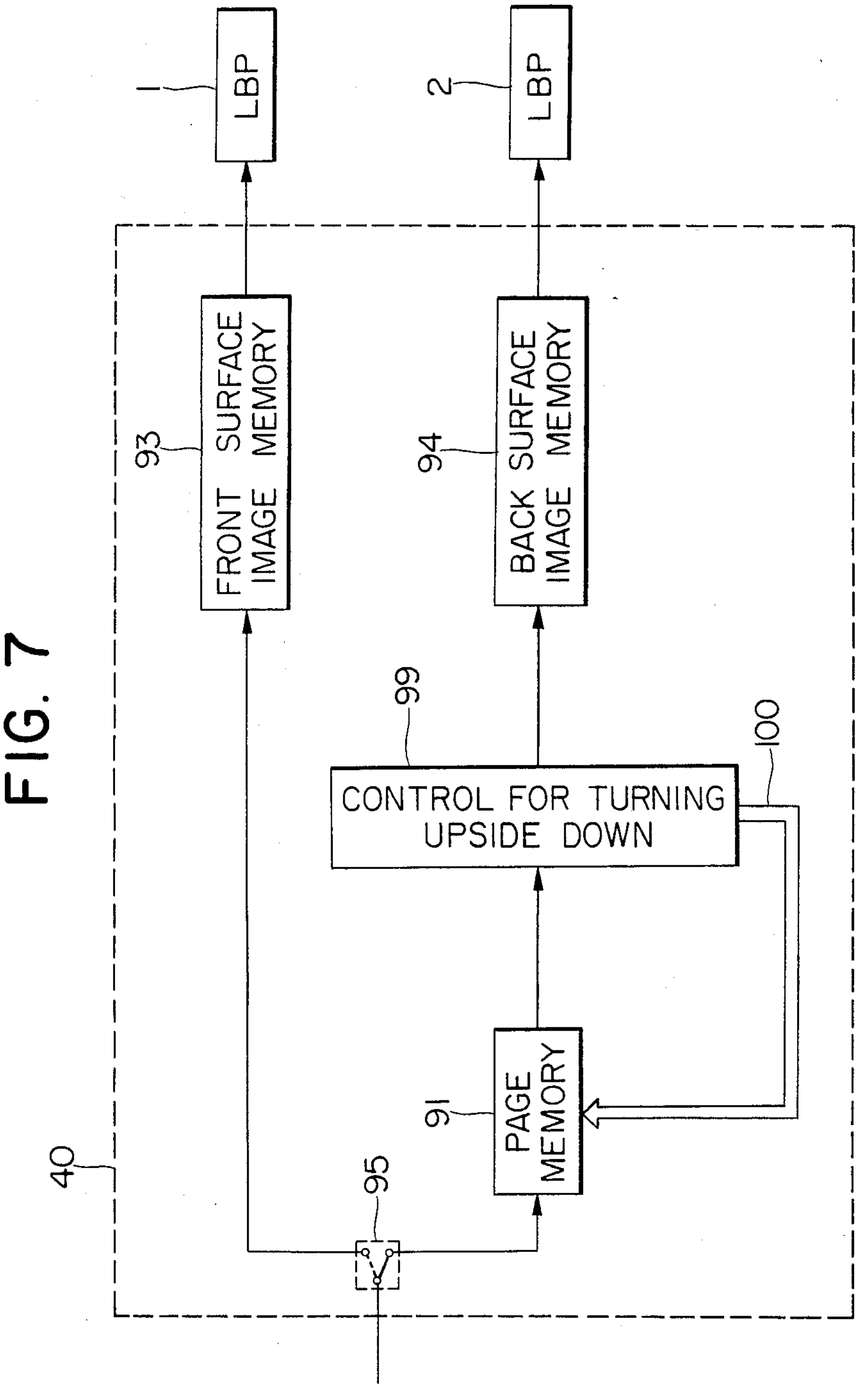

FIG. 7 is a block diagram showing a control unit 40 for turning only the back surface image information upside down and recording images on both sides of sheets by means of the LBP 1 and the LBP 2. This control unit is provided in the reversing device 3.

Figure 5:
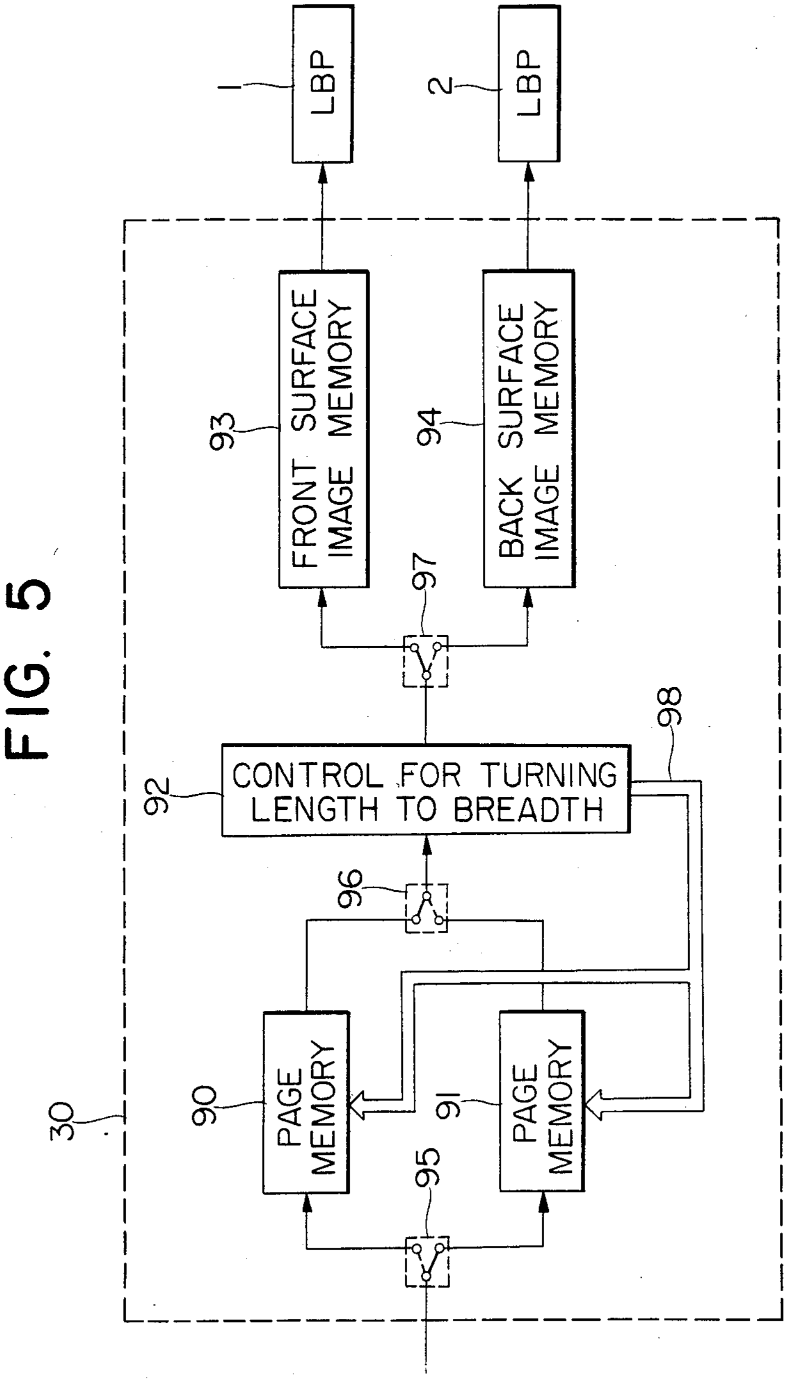
FIGS. 5 and 7 are block diagrams showing control units for changing image information.

In FIG. 7, reference numerals similar to those in FIG. 5 designate similar members, reference numeral 99 denotes a control for turning upside down, namely, for turning the top and bottom of image information, and reference numeral 100 designates an address bus for selecting the address of the page memory 91.

The front surface image information sent from CPU, MT or the like is stored in the front surface image memory 93 by the switch 95. On the basis of this image information, image recording is effected on the front surface of a sheet by the LBP 1. The back surface image information is stored in the page memory 91 by the switch 95. Address control is effected so that the data written in the page memory 91 in the column direction of by the control 99 for turning upside down is read out from the last line in the direction opposite to the direction of column. In this manner, the image information turned upside down is stored in the back surface image memory 94 and, on the basis of this image information, image recording is effected on the back surface of the sheet by the LBP 2.

The sheets printed out onto the discharge tray 5 by the above-described both-side recording system can be taken out and filed into a book by binding the sheets at the left or right side edge thereof.

Figure 8:
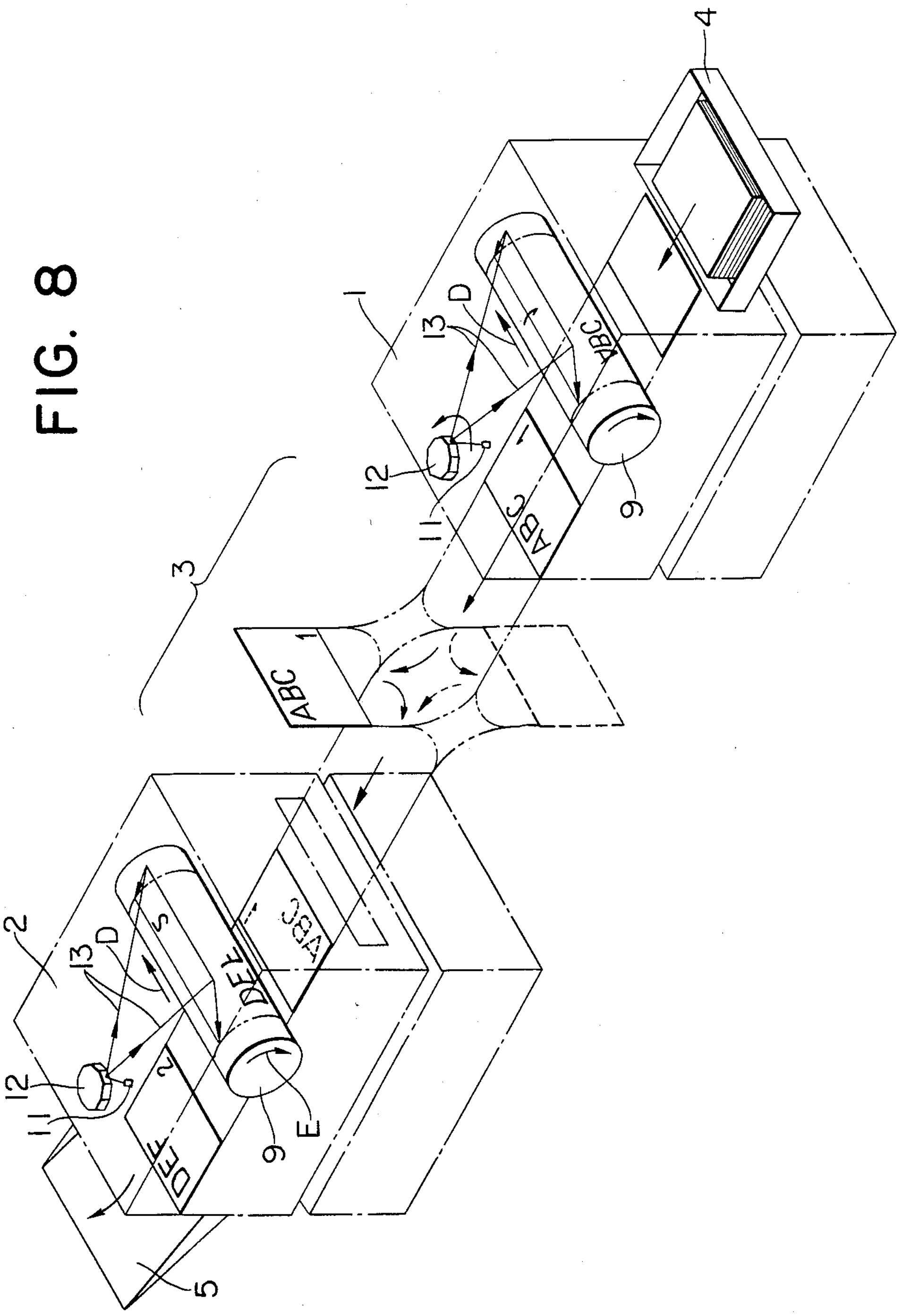
FIG. 8 is a schematic perspective view showing the image forming process of the one-side recording system.

However, where the sheets are to be filed into a book by binding the sheets at the upper side edge thereof as in a case where the output paper of a line printer or the like is cover-bound at the upper side edge thereof while being folded, printing is effected with the front surface image information and the back surface image information sent to the first LBP 1 and the second LBP 2, respectively, in the same manner as in the conventional one-side recording system by the use of the image recording process shown in FIG. 8 and without changing the image information as indicated by broken line in the block diagram of FIG. 5 or 7.

Accordingly, it is possible to predetermine the direction in which the printed out sheets are bound, selecting the both-side recording system or the one-side recording system, and to effect printing on both sides of the sheets.

In the present embodiment, laser beam printers using semiconductor lasers are employed as the recording apparatus, but this is not restrictive. For example, use may be made of electrophotographic printers using LED arrays or printers using a multistylus.

Also, the control unit for turning the direction of the image information may be provided in the reversing device 3 or in each printer.

As described above, both-side recording can be realized simply and at low cost by a machine using two compact and inexpensive recording apparatuses exclusively for use for one-side recording and a switch back type sheet reversing device connected therebetween.

Also, the reversing device has two upper and lower reversing mechanisms which are used alternately and therefore, both-side recording can be accomplished at the maximum printing speed of the recording apparatus without reducing the throughput.

Further, since the apparatus of the present invention is of a construction in which sheets are cooled within the reversing device, curling of sheets can be prevented and jamming of the sheets during the reversal or the paper re-supply can be decreased and yet, the sheets are reversed and re-printed after the fixation heat of toner images is removed and the toner images are completely fixed on the sheets, and therefore, the toner offset to the apparatus can be reduced.

Also, printers in which the paper feeding unit and the paper discharge unit are on the opposite sides and sheets are conveyed substantially horizontally and toner images are printed on the upper side of the sheets are used as the recording apparatus, whereby design can be made such that the front surface of the sheets is printed by the first printer and then the sheets are switched back and reversed, whereafter the back surface of the sheets is printed by the second printer and the sheets are output onto the discharge tray, and therefore, conveyance of the sheets is simple with the least possibility of jamming and the sheets can be continuously output and in addition, the sheets are successively piled on the discharge tray with the front surface of the first sheet as the lowermost surface and thus, the sheets are arranged in good page order.

A circuit for turning the direction of image information, i.e., for turning length to breadth or turning upside down, is provided in the reversing device and thus, both-side printed sheets suited for filing or binding can be output.

Also, when both-side printing is not necessary, the printers can be separated from the reversing device and can be discretely be used as independent compact terminal apparatuses.

A second embodiment of the present invention will now be described in detail.

Figure 9:
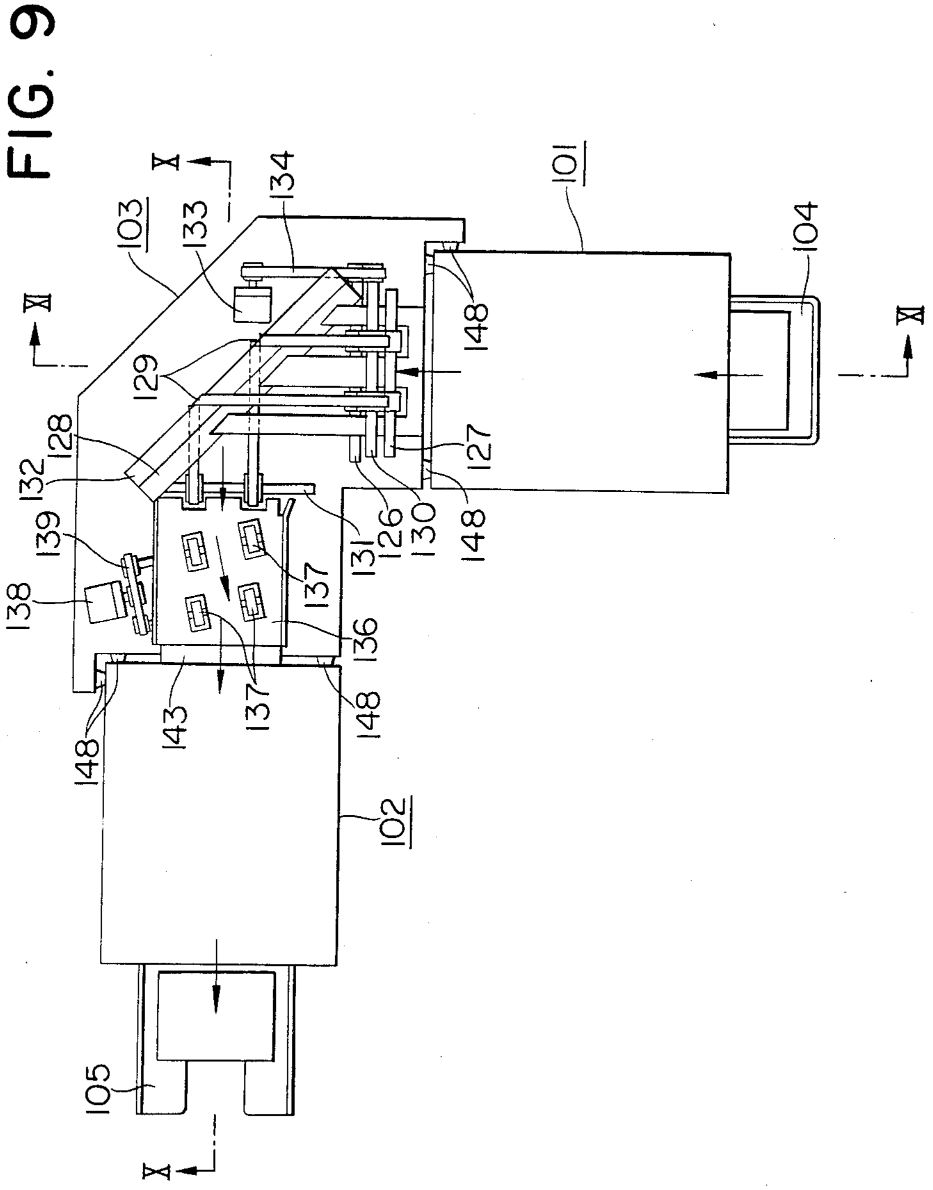
FIG. 9 is a plan view of another embodiment of the present invention.
Figure 10:
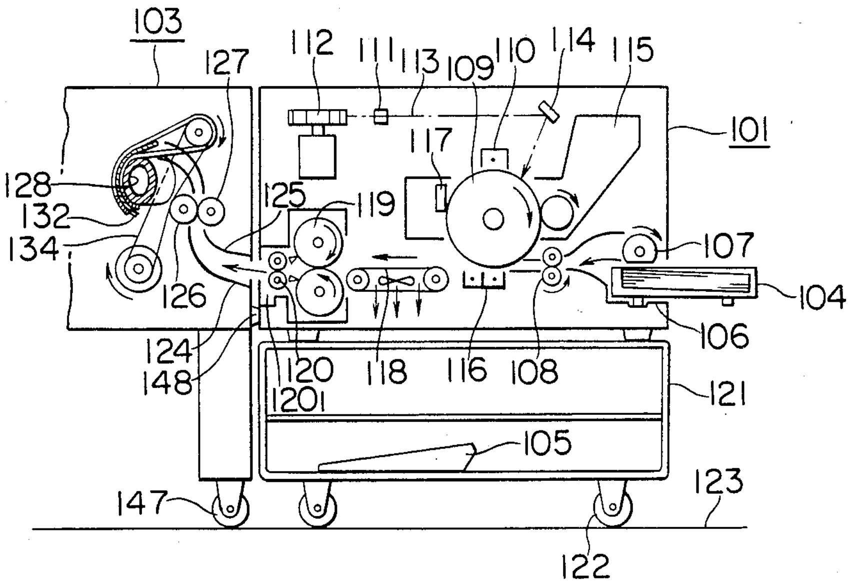
FIGS. 10 and 11 are cross-sectional views taken along lines X—X and XI—XI, respectively, of FIG. 9.
Figure 11:
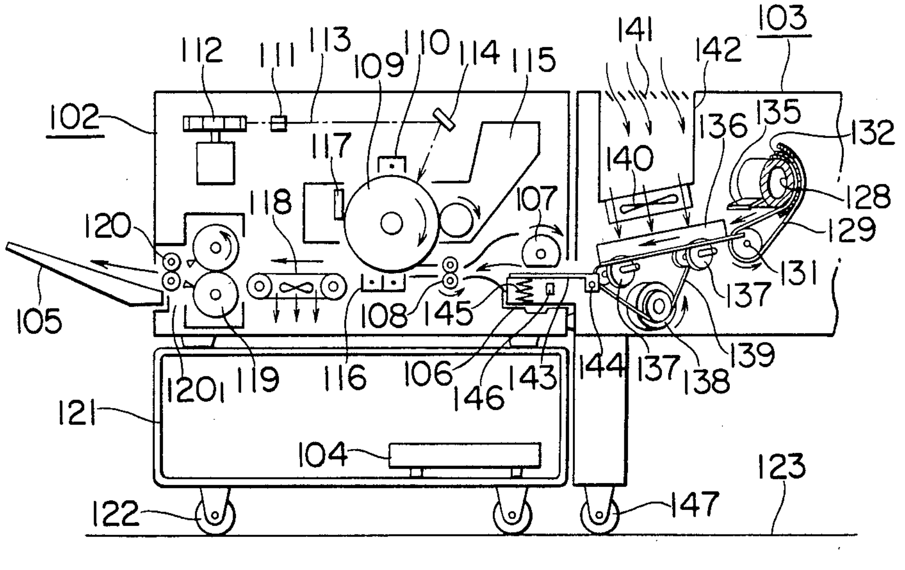
Figure 12:
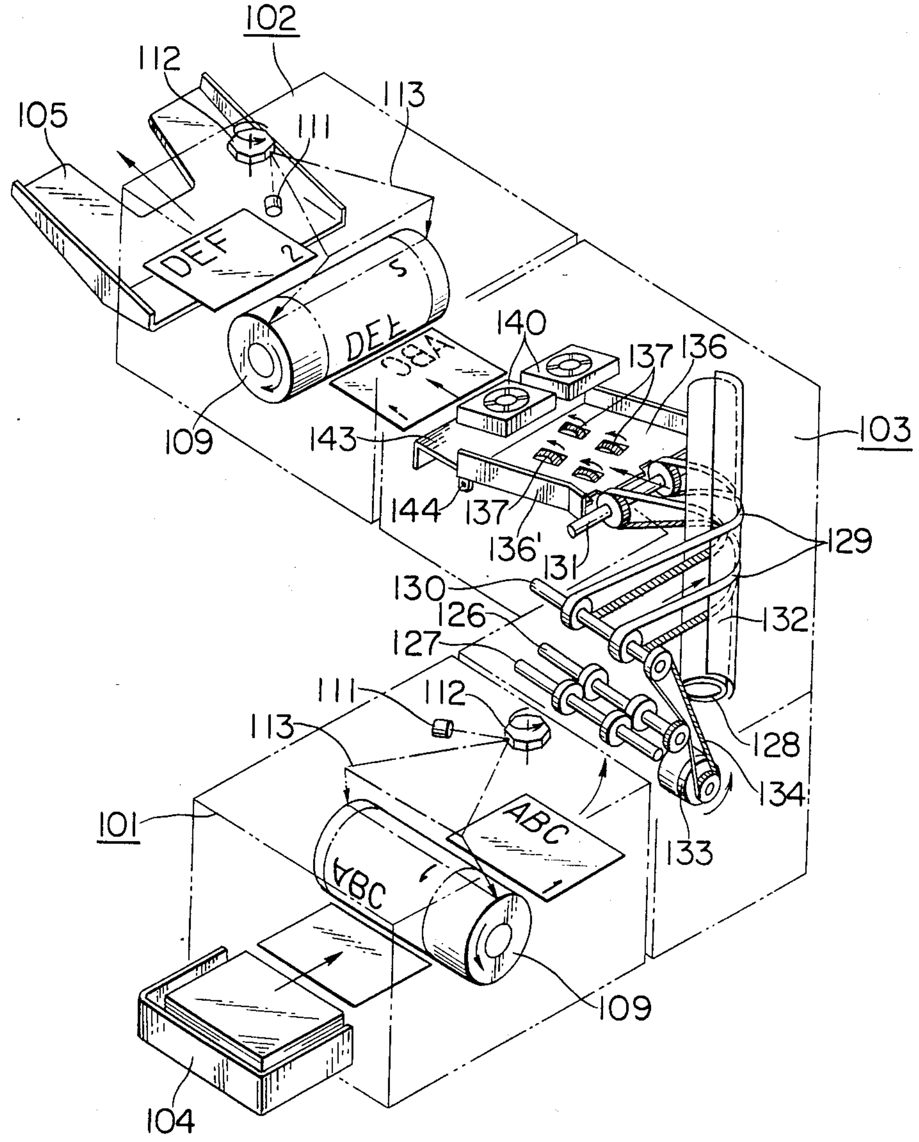
FIG. 12 is a perspective view showing the both-side recording process.

FIG. 9 is a plan view of the entire apparatus of the second embodiment, FIG. 10 is a cross-sectional view taken along line X—X of FIG. 9 (a longitudinal cross-sectional view of a first recording apparatus portion), FIG. 11 is a cross-sectional view taken along line XI—XI of FIG. 9 (a longitudinal cross-sectional view of a second recording apparatus portion), and FIG. 12 is a perspective view of the entire apparatus.

In these Figures, reference numeral 101 designates a first recording apparatus, reference numeral 102 denotes a second recording apparatus, and reference numeral 103 designates a reversing device. The first and second recording apparatuses 101 and 102 are connected together through the reversing device 103 so as to assume a generally L-shaped arrangement form in which the axes thereof are substantially orthogonal to each other, in which the paper conveyance direction is turned through a predetermined angle by the reversing device (the angle being 90° here).

The first recording apparatus 101 serves to print the front surface of sheets and the second recording apparatus 102 serves to print the back surface of sheets. The first and second recording apparatuses 101 and 102 may adopt any of various conventional image formation principles or processes. In the present embodiment, both of the first and second recording apparatuses 101 and 102 adopt a so-called laser printer of the drum image transfer electrophotography type in which image exposure is effected by laser beam scanning. The laser printer has the merit that it is relatively inexpensive and compact. The first and second recording apparatuses will hereinafter be referred to as the first and second laser printers, respectively.

In the first laser printer 101, reference numeral 104 designates a paper supply cassette mounted on a cassette cradle 106, reference numeral 107 denotes a pick-up roller for taking out sheets one by one from the paper supply cassette 104, and reference numeral 108 designates register rollers for feeding the taken out sheets to an image transfer station at predetermined timing. Reference numeral 109 denotes a rotatable photosensitive drum, reference numeral 110 designates a charger, reference numeral 111 denotes a semiconductor laser, reference numeral 112 designates a scanner, reference numeral 113 denotes a laser beam, reference numeral 114 designates a turning-back mirror, reference numeral 115 denotes a developing device, reference numeral 116 designates a transfer charger and reference numeral 117 denotes a cleaner. That is, the first laser printer is of a construction in which the laser beam 113 of the semiconductor laser 11 turned on and off correspondingly to image information is scanned lengthwise of the photosensitive drum 109 by the scanner 112 to thereby form an electrostatic latent image which is developed into a toner image by the developing device 115. Reference numeral 118 designates a conveyor for sucking sheets having toner images transferred to the front surface thereof by a suction mechanism and conveying the sheets by a belt, reference numeral 119 denotes a fixing device for heat-fixing the toner images on the sheets, and reference numeral 120 designates paper discharge rollers. Denoted by $120_1$ is a paper discharge port. A paper discharge tray 105 removably mountable in the paper discharge port is removed in the case of the first laser printer 101 and is contained in a pedestal 121 with casters 122 on which the printer 101 rests.

By pushing the pedestal 121 on which the printer 101 rests relative to the reversing device 103 so that the paper discharge port $120_1$ of the printer 101 becomes opposed to and communicated with the sheet inlet port $124_1$ of the reversing device 103, the printer 101 and the reversing device 103 are rendered connected together. Reference numeral 148 designates an abutment shock absorbing stopper between the printer 101 and the reversing device 103, and reference numeral 123 denotes a floor.

The second laser printer 102 is of entirely the same construction as the first laser printer 101. However, with regard to the second laser printer 102, a paper supply cassette 104 is removed from a cassette cradle 106 and contained in a pedestal 121 on which the printer 102 rests.

By mounting a paper re-supply plate 143 on the cassette cradle 106 of the printer 102 and pushing the pedestal 121 on which the printer 102 rests relative to the reversing device 103 so that the paper re-supply plate 143 comes into the sheet outlet $124_2$ of the reversing device 103, the printer 102 and the reversing device 103 are rendered connected together.

The interconnected condition of the first laser printer 101, the reversing device 103 and the second laser printer 102 is kept invariable by locking the casters 122 and 147. Alternatively, the interconnected condition may be kept by providing interconnecting means among the first printer 101, the reversing device 103 and the second printer 102 as required. As a further alternative, the first printer 101, the reversing device 103 and the second printer 102 may be constructed into a single unit.

In the reversing device 103, reference numerals 124 and 125 (FIG. 10) designate sheet guides for upwardly guiding the sheets discharged from the first laser printer 101, reference numerals 126 and 127 denote conveyor rollers, and reference numeral 128 designates a turn bar fixed to a side plate, not shown, at an angle of 45° with respect to the direction of movement of the sheets. Designated by 129 is an endless turn belt which is adapted to contact the printed surface of a sheet and turn the sheet along the outer peripheral surface of the turn bar spirally (in the fashion of a screw) by about 180°. The turn bar 128 has a smooth curved surface in which the friction force between the outer peripheral surface and the sheet is smaller than the friction force between the conveying surface of the turn belt 129 and the sheet. Denoted by 130 and 131 are belt rollers over which the turn belt 129 is passed and which rotatively drive the turn belt 129. Reference numeral 132 designates a belt guide placed on the outer periphery of the turn bar 128 in proximity to the thickness of the turn belt 129 for guiding the turn belt 129 by a curved surface of low friction. Reference numeral 133 denotes a sheet reversing motor which rotatively drives the conveyor roller 126 and the belt roller 130 through a timing belt 134. Designated by 135 is a sheet separating plate having the end thereof bearing against the turn bar 129. Reference numeral 136 denotes a control guide for controlling one end edge of a reversed sheet by a bent rising portion, and reference numeral 137 designates oblique movement rollers rotatably supported by the control guide 136 and inclined by about 15° with respect to the direction of movement of sheets to obliquely convey the sheets. Reference numeral 138 denotes a motor for rotatively driving the oblique movement rollers 137, and reference numeral 139 designates a timing belt. Reference numeral 140 denotes a cooling fan, reference numeral 141 designates a louver and reference numeral 142 denotes a duct. Sheets heat-fixed in the first laser printer 101 have residual heat therein which may cause curling of the sheets or unsatisfactory fixation and for this reason, the sheets are sufficiently cooled by the cooling fan 140. Also, in the control guide 136, the sheet conveying force of the control roller is supplemented by the wind pressure of the cooling fan 140. Reference numeral 143 designates a paper re-supply plate for supplying sheets to the second laser printer 102, reference numeral 144 denotes a pivot shaft and reference numeral 145 designates a compression spring. The paper re-supply plate 143 is pivotably supported on the pivot shaft 144 and upwardly biased by the compression spring 145. The paper re-supply plate 143 is mounted on the cassette cradle 106 of the second laser printer 102. Designated by 146 is a sheet sensor for detecting the leading end edge of a sheet. As soon as this sensor detects the leading end edge of a sheet, the pick-up roller 107 of the second laser printer 102 is rotated to start printing on the back surface of sheets. The sheets printed by the second laser printer 102 are discharged onto the discharge tray 105 with their front surfaces facing down.

In the first laser printer 101, a sheet is fed to the register rollers 108 by the pick-up roller 107, and the register rollers 108 are rotated at such timing that the leading end edge of the image formed on the surface of the photosensitive drum 109 is coincident with the leading end edge of the sheet, and the sheet is brought into contact with the surface of the photosensitive drum 109, whereby the toner image on the surface of the photosensitive drum is transferred to the sheet. The sheet is then conveyed to the heat-fixing device 119 by the conveyor 118 for fixation of the image thereon, and then the sheet is discharged by the paper discharge rollers 120.

Subsequently, the discharged sheet passes between the sheet guides 124 and 125 in the reversing device 103 and is transported upwardly by the conveyor rollers 126 and 127. The sheet is then nipped between the turn bar 128 and the rotating turn belt 129 and belt-conveyed along the outer peripheral surface of the turn bar 128 with the back surface of the sheet in contact with the turn bar 128 and the front surface of the sheet in contact with the turn belt 129. As a result, the conveyed sheet turns its direction of movement by about 90° with respect to the direction of conveyance in the first laser printer 101 and the sheet is reversed.

The reversed sheet, when transported to the control guide 136, is conveyed with its leading end edge caused to bear against the rising surface of the control guide 136 by the obliquely leftward conveying force of the control roller 137 and the action of the wind pressure of the cooling fan 140 and thus, alignment of the sheet relative to the second laser printer 102 is effected.

Further, the sheet is transported onto the paper re-supply plate 143 with the left end edge thereof bearing against the rising surface of the control guide 136. When the sheet sensor 146 detects the leading end edge of the sheet, the second laser printer 102 starts printing and the pick-up roller 107 is started. On the upper surface of the sheet, a back surface image is printed by the second laser printer 102 in the same process as that in which the front surface image was printed in the first laser printer 101, and then the sheet is discharged onto the discharge tray 105.

FIG. 12 is a perspective view showing the process in which characters are recorded on both sides of a sheet in the second embodiment of the present invention. In the first laser printer 101, the image pattern ABC of the first page is formed on the photosensitive drum 109 and it is printed on the upper surface of the sheet. In the reversing device 103, the sheet is conveyed along the turn bar 128 and the turn belt 129 and changes its direction of movement by 90° and yet the sheet is reversed. Thereafter, the sheet is aligned with the second laser printer 102 while being cooled and is re-supplied to the second laser printer 102. In the second laser printer 102, the image pattern DEF of the second page is formed on the photosensitive drum 109 and it is printed on the upper surface of the sheet.

In the present embodiment, the first laser printer 101 and the second laser printer 102 are disposed orthogonally to each other and the reversing device 103 is connected therebetween, but it is possible to make the arrangement angle of the two laser printers smaller or greater than 90° by changing the mounting angle of the turn bar and the direction of winding of the turn belts in the reversing device 103.

The number of turn belts is not limited to two, but may be one or three or more. Accordingly, a reversing device which is disposed between the first and second laser printers disposed substantially horizontally and in which sheets are turned with respect to the direction of movement thereof and change the left and right side edges thereof instead of changing the leading and trailing end edges can be easily realized if the reversing device of the present invention is applied.

The recording apparatuses are not limited to laser printers using semiconductor lasers, but may also be LED printers or the like using LED arrays.

As described above, both-side recording using compact and inexpensive recording apparatuses exclusively for use for one-side recording can be simply realized by connecting two recording apparatuses 101 and 102 to the turnable type sheet reversing device 103 so that the front surface of sheets is printed by the first recording apparatus 101 and the back surface of sheets is printed by the second recording apparatus 102, and moreover, printing can be accomplished continuously and the throughput is not reduced.

Further, sheets having both sides printed are piled on the discharge tray in the order of pages so that the lowermost surface is the first page, and this facilitates the filing or binding of the sheets.

Also, the arrangement of the two recording apparatuses in orthogonal relationship with each other reduces the space required and requires the operator to move only slightly, and this leads to improved operability of the apparatus.

What is claimed is:

1. A both-side recording system for recording images on both sides of a sheet, comprising:

first recording means for recording an image on a sheet;

second recording means for recording an image on a sheet;

first and second reversing portions connecting said first and second recording means, said first and second reversing portions being adapted to reverse a sheet on one side of which an image has been recorded by said first recording means and leading the reversed sheet to said second recording means; and selecting means for selectively leading a sheet conveyed from said first recording means after one-side recording to said first reversing portion or to said second reversing portion.

2. The system of claim 1, wherein said first and second reversing portions and said first and second recording means are aligned in a straight line when said reversing portions and said recording means are in position for operation.

3. The system of claim 1, wherein said selecting means leads said sheet alternately to said first reversing portion or to said second reversing portion.

4. The system of claim 1, wherein said first and second reversing portions comprise a connecting portion removably connected to a sheet discharge port of the first recording means and to a sheet entrance port of the second recording means.

5. The system of claim 1, wherein said first and second reversing portions comprise a common sheet entering port through which the sheet may enter and a common sheet discharging port through which the sheet passes toward the second recording means.

6. The system of claim 1, wherein said first reversing portion is disposed above the second reversing portion.

7. A reversing mechanism for application to a both-side image recording system for recording images on both sides of a sheet, comprising:

first and second reversing means for reversing a sheet on one side of which a first image has been recorded by recording means for recording an image on a sheet; and selecting means for alternately leading the sheet passed through the recording means to said first reversing means or to said second reversing means in order to reverse the sheet having said first image recorded thereon so that a second image may be recorded on the second side thereof.

8. The mechanism of claim 7, wherein said first reversing means is disposed above the second reversing means.

* * * * *